United States Patent [19]

Scheer

[11] 3,723,953
[45] Mar. 27, 1973

[54] DEVICE FOR PRODUCING BEARING TRACES IN DIRECTION FINDING APPARATUS

[75] Inventor: Kurt Scheer, Bremen, Germany

[73] Assignee: Fried. Kupp Gesellschaft mit beschanter Haftung, Essen, Germany

[22] Filed: Dec. 14, 1970

[21] Appl. No.: 97,998

[30] Foreign Application Priority Data

Dec. 12, 1969 Germany.....................P 19 62 336.0

[52] U.S. Cl....................340/3 R, 340/3 C, 340/6 R, 343/16 R
[51] Int. Cl. .............................G01s 9/66, G01s 3/00
[58] Field of Search........340/1 C, 1 R, 3 C, 3 R, 6 R, 340/16 R; 343/16 R, 118

[56] References Cited

UNITED STATES PATENTS

| 3,060,427 | 10/1962 | Jaffe et al. | 343/118 |
| 3,127,584 | 3/1964 | Hathaway | 340/3 R |

FOREIGN PATENTS OR APPLICATIONS

| 1,086,487 | 10/1967 | Great Britain | 340/3 C |

Primary Examiner—Richard A. Farley
Attorney—Spencer & Kaye

[57] ABSTRACT

An improved apparatus for producing one or a plurality of bearing traces associated with arbitrarily selectable directions in a paroramic display on the screen of a cathode-ray tube indicator for a direction finding system operating according to the reflected beam method (radar or sonar devices) with synchronous rotation of the direction of the radar or sonar beams (bearing direction) and the direction of deflection of the cathode-ray beam through the aid of bearing direction signals, including a reference direction, e.g., forward, signal and angle of rotation signal in the form of an alternating voltage signal, contained in a bearing information channel transmitting these signals from the transmitter-receiver of the system to the deflection system of the cathode-ray tube. The desired bearing traces are produced by feeding the bearing direction signals to a digital or analog integrating means which converts the angle of rotation signal into a measured bearing angle value which corresponds to the momentary angle of rotation, relative to the reference direction. The measured bearing angle value signal is fed to at least one bearing trace signal generator which compares the measured bearing angle value with a preset desired bearing angle value supplied by an associated comparison value generator, and emits a bearing trace signal whenever there is coincidence between the measured bearing angle value and the preset bearing angle value. The bearing trace signals are in turn fed to the brightness control circuitry of the cathode-ray tube to cause the desired bearing traces to be produced on the screen. A plurality of bearing traces can be produced either by providing a plurality of parallelly connected bearing trace generators, each of which compares the measured bearing angle value with a different preset bearing angle value, or by connecting a storage device to the output of a single bearing trace signal generator which circulates stored data in synchronism with the momentary bearing angle and has its output also connected to the brightness control circuitry of the cathode-ray tube.

8 Claims, 4 Drawing Figures

United States Patent [19]
Scheer
[11] 3,723,953
[45] Mar. 27, 1973
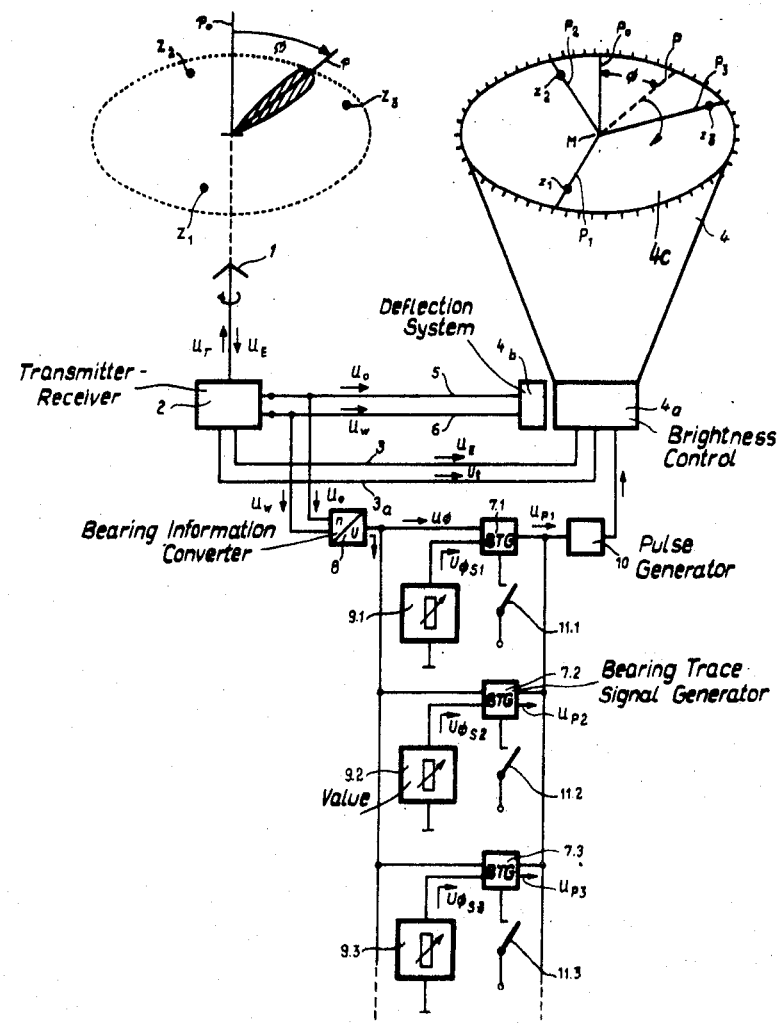

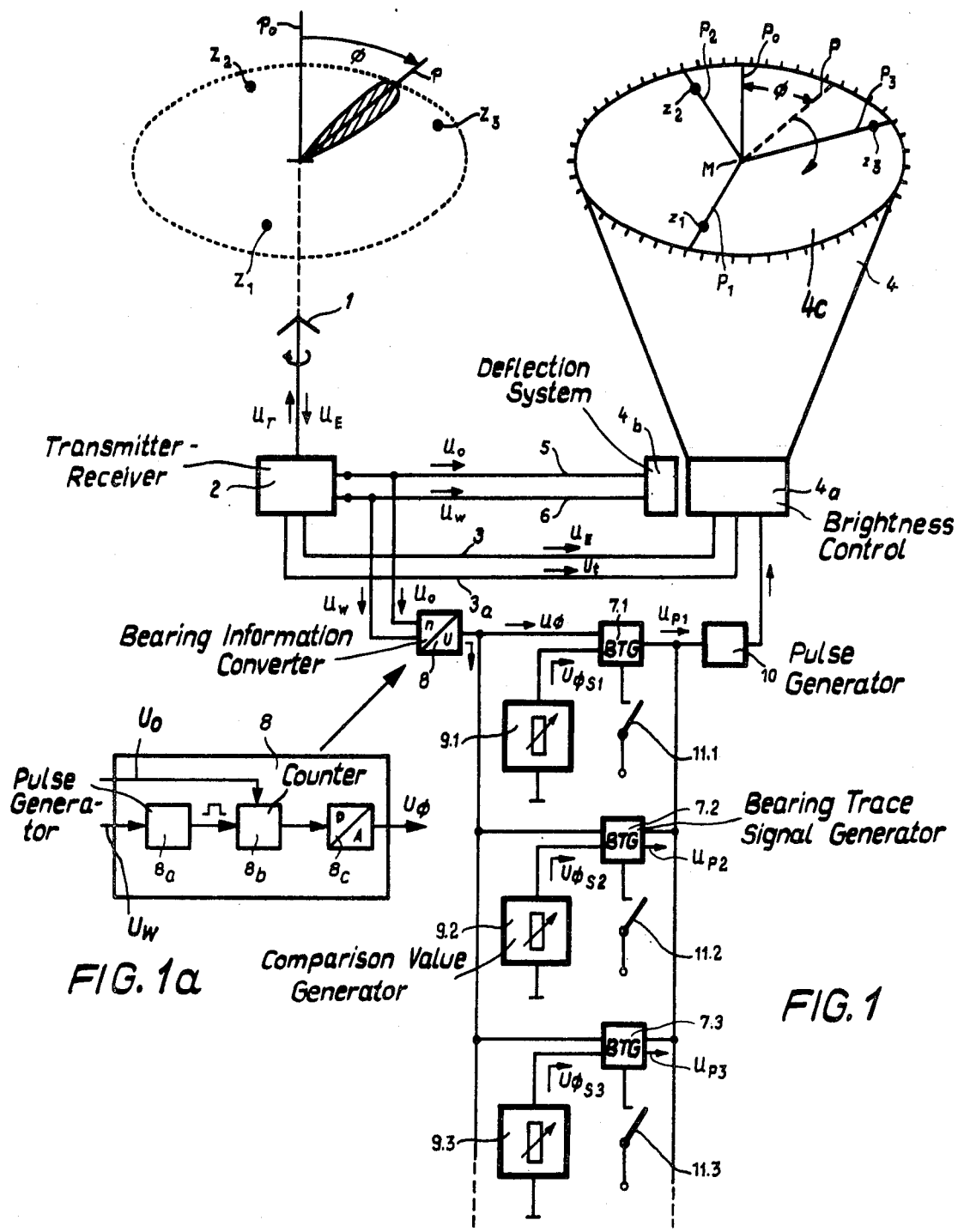

__NUM__3,723,953__NUM__

DEVICE FOR PRODUCING BEARING TRACES IN DIRECTION FINDING APPARATUS

BACKGROUND OF THE INVENTION

The present invention relates to an apparatus for producing, on the screen of a cathode-ray tube and in panoramic display, one or a plurality of bearing traces associated with arbitrarily selectable directions for direction finding apparatus operating according to the reflected beam method (radar or sonar devices) with synchronous rotation of the direction of the radar or sonar beams (bearing direction) and the direction of the deflection of the cathode-ray beam. More particularly this invention relates to an improved apparatus for producing such bearing traces with the aid of the bearing signals (forward direction signal and angle of rotation signal) within the bearing information channel transmitting these signals between the transmitter-receiver of the system and the deflection apparatus of the cathode-ray tube.

In radar as well as sonar devices it is often desirable to have an apparatus available for producing a bearing trace and, if desired, a large number of such bearing traces. This is particularly desirable in order to prevent collisions when you have large traffic densities, when the so-called "standing bearing" is used as the most important indicium of the so-called collision course where the target remains in the relative position marked by a bearing trace.

In known devices of the above-mentioned type (see, for example, British Pat. No. 1,089,487) an independent second deflection system which is operated in the interscan method, i.e., alternatingly with the first deflection system in time intervals between radar reflection periods, is usually provided to produce a bearing trace on the screen of the cathode-ray tube.

It has also been proposed in copending U.S. application Ser. No. 840,941, filed July 11th 1969 by C.W. Busch et al., which issued March 7th, 1972, as U.S. Pat. No. 3,648,283 and which is assigned to the same assignee as the present application, to employ a mechanically rotating magnetic memory, which rotates in synchronism with the beam generator of the direction finding system, as the bearing trace signal generator so as to produce a plurality of bearing traces, one for each bearing marker, for each revolution of the memory.

Although the above-mentioned bearing trace generating schemes operate satisfactorily, they suffer from the drawback that in order to produce a desired large number of such bearing traces the equipment required is relatively expensive, complex, and/or cumbersome.

SUMMARY OF THE INVENTION

It is, therefore, the object of the present invention to provide an apparatus of the type mentioned above which permits the setting of a plurality of bearing traces in arbitrarily selectable bearing directions with the smallest possible number of components and with ease of operation.

It is a further object of the present invention to provide an apparatus which produces such bearing trace signals, as in the known interscan method systems, by purely electrical means, but in a structurally and operationally simpler manner.

The above objects are achieved according to the invention by utilizing the already available bearing direction signals, i.e., the reference, e.g., forward, direction signal and the AC voltage angle of rotation signal, transmitted from the transmitter-receiver of the system to the deflection system of the cathode-ray tube indicators in order to provide synchronization between the direction of rotation of the beam of the system and the direction of deflection of the cathode-ray beam, to generate the bearing trace signals. According to the invention, the above-mentioned bearing direction signals are fed to a bearing information converter which, either digitally or analogously, integrates the angle of rotation signal and converts it into a measured bearing angle which corresponds to the momentary bearing angle with respect to the reference direction. The measured bearing angle value is fed to at least one bearing trace signal generator which emits a bearing trace signal whenever it receives a measured bearing angle value which coincides with a preset bearing angle value, corresponding to the direction of a desired bearing tracer, supplied by an associated comparison value generator. The emitted bearing trace signal is then fed to the brightness control circuit of the cathode-ray tube to provide the desired bearing trace on the screen thereof.

This utilization according to the present invention of the bearing information which is already available for the synchronization of the rotation of the beam generator and the angular deflection of the cathode-ray beam thus makes it possible for smaller direction finding systems which are not equipped with an interscan device to have a very simple and yet entirely dependable device for the production of bearing traces.

In order to provide a plurality of bearing traces which are independent of one another, according to one embodiment of the invention, a plurality of bearing trace signal generators connected in parallel are provided. Each of the bearing trace signal generators then compares the measured bearing angle value signal with a different preset bearing angle value and emits a bearing trace signal when a comparison is received, thus supplying a plurality of sequential bearing trace signals to the brightness control circuit of the cathode-ray tube to produce the desired plurality of bearing traces on the screen.

If a larger number of bearing traces are to be produced, according to a further embodiment of the invention, it is more advantageous to operate with only a single common bearing trace signal generator of the above-described type and to provide a storage device in which the stored contents circulate synchronously with the bearing direction. The storage device is provided with an input which can be selectively connected with the output of the bearing trace signal generator and an output which is connected with the bearing trace signal input at the brightness control circuit of the cathode-ray tube. Such a storage device may, for example, be constructed as a simple shift register. The storage device is advantageously provided with an erase input for erasing a single bearing trace and may, if desired, also be provided with an erase input for erasing the entire stored contents.

BRIEF DESCRIPTION OF THE DRAWINGS

FIG. 1 is a block circuit diagram of a direction finding system provided with a first embodiment of a bearing trace generating apparatus according to the invention.

FIG. 1a is a detail block circuit diagram of the bearing information converter of FIG. 1.

DESCRIPTION OF THE PREFERRED EMBODIMENTS

Figure 2:
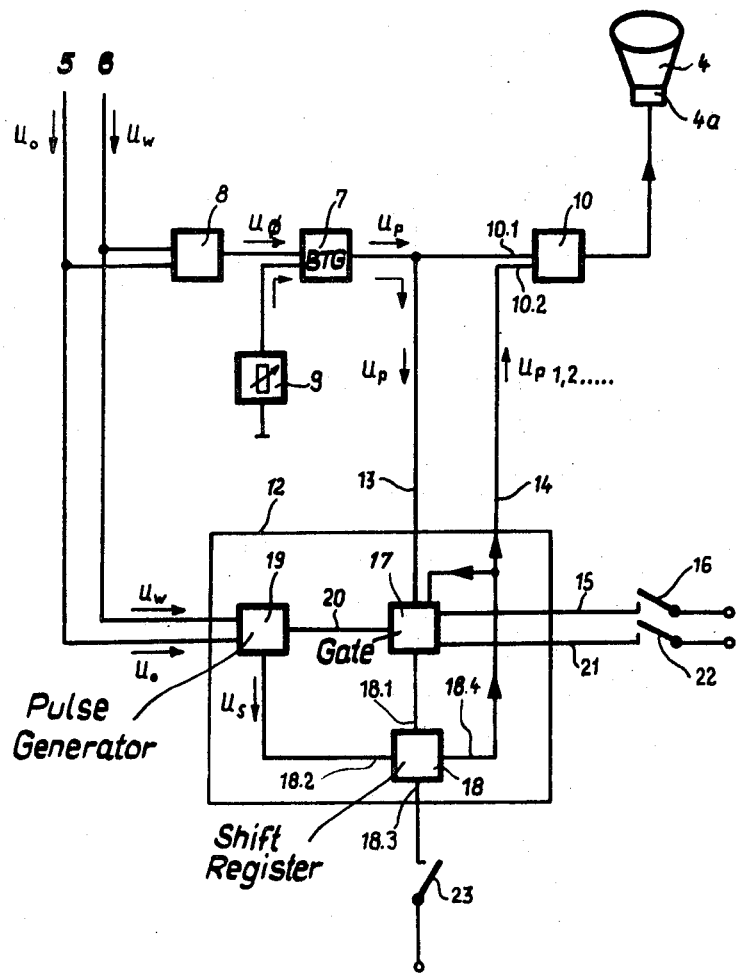
FIG. 2 is a block circuit diagram illustrating a modification of the system of FIG. 1 according to a further embodiment of the invention.

In the illustrated embodiments the invention is described with respect to its application for a radar system. It is to be understood, however, that the invention can generally also be used with other direction finding systems which operate according to the reflected beam method and can thus be employed with particular advantage in sonar systems. The panorama or PPI (Plan Position Indication) display for deflected beam direction finding systems is well known in the art. In such systems, as shown in FIG. 1, echoes of signals $U_r$ transmitted by the rotating beam generator or antenna 1, which are reflected from reflecting objects in the observed range, e.g., objects Z1, Z2 and Z3, are received by beam generator 1 and transmitted as received signals $U_E$ via the transmitter-receiver 2 of the system and a received pulse channel 3 to the brightness control circuit 4a of a cathode-ray tube 4 having a rotating deflection system 4b.

To synchronize the respective r direction p of the transmitted beam of signals $U_4$ and the momentary deflection direction of the cathode-ray beam in the cathode-ray tube 4, the transmitter-receiver 2, in conventional radar systems, is connected with the deflection system 4b by means of a bearing information channel 5, 6 through which are transmitted the bearing information signals, i.e., reference or forward direction signals $U_O$ and angle of rotation signals $U_w$, the latter consisting of an alternating or AC voltage at a frequency proportional to the momentary speed of rotation of the antenna 1, i.e., in the case of a constantly rotating antenna 1 the signal $U_w$ will have a constant frequency, e.g., 50 Hz. By means of a further channel 3a, a synchronizing signal $U_t$ which is coupled with the transmitted signal $U_r$ in a fixed phase relationship is transmitted to the brightness control circuit 4a so that the respective start of the radial deflection of the electron beam from the center point M of the screen rc of the cathode-ray tube 4 is synchronized with the emission of transmitted signal $U_r$ by beam generator 1.

As mentioned above, for such systems, it is known, for example, to mark the bearing directions p of reflecting objects Z by means of bearing traces P on the screen 4c of the cathode-ray tube 4. To provide such markings, a special arrangement must be provided which can produce a plurality of bearing traces P in arbitrary bearing direction p, as well as to selectively erase the bearing traces P. FIG. 1 shows such a special arrangement according to the invention in which separate bearing trace signal generators 7.1, 7.2, 7.3, etc. are provided for producing the desired bearing traces $P_1$, $P_2$, $P_3$. Each of the bearing trace signal generators 7.1, 7.2, 7.3, substantially consists of an electronic comparison stage and is controlled by a bearing angle value signal $U \phi$ appearing at the output of a bearing information converter 8 and by a bearing angle value signal $U \phi_{s1}$, $U \phi_{s2}$, or $U \phi_{s3}$ from comparison value generators 9.1, 9.2, 9.3, respectively. The bearing information converter 8 is controlled by both bearing information signals, i.e., the forward direction signal $U_O$ and the angle of rotation signal $U_w$, transmitted from the transmitter-receiver 2, and integrates the angle of rotation signal $U_2$ to provide a measured bearing angle value $U \phi$ corresponding to the respective value of the momentary bearing angle $\phi$ with respect to the reference or forward direction $P_O$ for the direction finding system which corresponds to a bearing trace $P_O$ on the screen 4c. The setting members (indicated schematically by the variable resistors) of each of the comparison value generators 9.1, 9.2, 9.3 is preset to provide a selected bearing angle value $U \phi_{s1}$, $U \phi_{s2}$, $U \phi_{s3}$, respectively, which corresponds to the angular direction of a desired bearing trace $P_1$, $P_2$ or $P_3$. Each of the bearing trace signal generators 7.1, 7.2 and 7.3 continuously compares the measured bearing angle value signal $U \phi$ with the respective preset bearing angle value $U \phi_{s1}$, $U \phi_{s2}$, $U \phi_{s3}$ and upon coincidence emits a respective bearing trace signal $U_{P1}$, $U_{P2}$, or $U_{P3}$ which is fed to the brightness control circuit 4a to produce bearing traces $P_1$, $P_2$, $P_3$, which pass through the image points $z_1$, $z_2$, $z_3$ of the objects $Z_1$, $Z_2$, $Z_3$ being subjected to the echo sounding. Preferably the bearing trace signals $U_P$ are fed to the brightness control circuit via a pulse generator 10 wherein the bearing trace signals $U_P$ are given a shape which is particularly favorable for the production of bearing traces. It should be further understood that it is here also possible to provide the bearing traces with markers as this is generally known in the radar art.

In order to selectively produce individual bearing traces P on the screen 4c of cathode-ray tube 4, each bearing trace signal generator 7.1, 7.2, 7.3 is associated with a switch 11.1, 11.2, 11.3, respectively. Actuation of these switches 11.1, 11.2, 11.3 permits the setting or erasing of bearing traces P in any desired manner by effectively inserting or removing the respective bearing trace signal generator 7.1, 7.2 or 7.3 from the circuit arrangement.

The bearing information converter 8 may be designed in various ways. Preferably, as shown by way of example in FIG. 1a, it consists of a pulse generator 8a which is controlled by the angle of rotation signal $U_w$ to produce pulses proportional to the frequency thereof, a pulse counter 8b for counting the pulses and a digital-analog converter 8c connected to the output of the counter 8b. In order to bring the absolute value of the measured bearing angle value $U \phi$ thus determined into coincidence with the associated bearing direction p, the pulse counter 8b is set to zero each time when the beam generator 1 passes through the reference position — e.g., the forward direction $P_O$ or the north direction, by means of the reference direction signal $U_O$.

If the bearing information converter 8, as illustrated, contains a pulse counter 8b, the bearing trace signal generators 7.1, 7.2, 7.3 may, if desired, be designed as known digital coincidence stages. Thus it is possible to meet the highest demands for accuracy. In such case, however, the digital to analog converter 8c would be eliminated and the comparison value generator 9.1, 9.2 and 9.3 would provide digital values of the preset bearing angles.

With lesser demands for accuracy, the bearing information converter 8 may also be simply constructed so that integration of the pulses from the angle of rotation signal $U_w$ permits the derivation of a direct voltage as the measured bearing angle value $U \phi$ which is proportional to the bearing direction $P$.

In the embodiment shown in FIG. 1 the number of bearing trace generators 7 and the associated comparison value generators 9 should be so selected that it corresponds to the maximum desired number of arbitrarily settable bearing traces P. Any desired number of bearing traces P can also be produced within the scope of the present invention by a single bearing trace signal generator 7 when, as shown in FIG. 2, it has an associated storage device 12 which is controlled by the bearing direction signals, i.e., the reference or forward direction signal $U_O$ and the angle of rotation signal $U_w$, in such a manner that it can store and emit any desired number of bearing trace signal $U_P$ which are associated with different bearing directions. In order to generate and store the desired bearing trace signals $U_P$ a single comparison value generator 9 is set consecutively in any desired sequence to the values $U \phi_{s1}, U \phi_{s2}, U \phi_{s3}$, and the resulting bearing trace signals appearing at the output of the bearing trace signal generator 7 are fed via a store signal input 13 to the storage device 12 in synchronism with the angle of rotation signal $U_w$. Due to this synchronization, once each revolution of the beam generator 1, the stored signals appear at the output terminal 14 of the storage device 12 from where they are again fed to pulse generator 10 and to the brightness control portion 4a of cathode-ray tube 4. The pulse generator 10 is provided for this purpose with two decoupled inputs 10.1 and 10.2, with the first of these inputs being connected directly with the output of the bearing trace signal generator 7, and the second of these inputs being connected to the store output 14.

The storage device 12 advantageously consists substantially of a known shift register 18 of any desired construction (see, for example, "Static Shift Registers" in TI Report, May, 1969, page 34) and is provided with a setting key 16 through a setting input 15. When the setting key 16 is actuated, the gating stage 17 unblocks the input 13 so that the bearing trace signal $U_P$ which was produced corresponding to the previous setting of the comparison value generator 9 is fed to the setting input 18.1 of shift register 18 which is timed by a shift signal $U_s$ at its shift input 18.2. This shift signal $U_s$ is generated in a clock pulse generator 19 which is itself controlled by the two bearing direction signals, i.e., the forward direction signal $U_O$ and the angle of rotation signal $U_w$, so that the shifting pulses are in synchronism with the rotation of the beam generator 1. A synchronizing coupling 20 between the clock pulse generator 19 and the gating stage 17 assures that the bearing trace signals $U_P$ reach the setting input 18.1 of shift register 18 only in synchronism with the shift signal $U_s$.

Each bearing trace signal $U_P$ put into shift register 18 now circulates in shift register 18 and appears once during each passage of beam generator 1 through the associated bearing direction p at the output 18.4 of shift register 18 and thus actuates one bearing trace P during each revolution.

In order to be able to erase individual bearing traces P, a first erase input 21 is provided with a single erase key 22. The key 22 acts on gating stage 17 in such a way that the bearing trace signal $U_P$ which was provided in a known manner from the bearing trace signal generator 7 to the setting input 18.1 upon depression of setting key 16 is now erased. This is accomplished in that when the single erase key 22 is depressed, the gate 17 interrupts or blocks the connection between output 18.4 of shift register 18 and the input of gating stage 17 for the duration of exactly one interval of shift signal $U_s$. Since this connection is essential for further storage, the blocked bearing trace signal will be erased from the storage device. Thus, if a certain previously set bearing trace P is to be erased, to determine when the key 22 should be depressed, the comparison value generator 9 is adjusted until the newly displayed and continuously changing bearing trace P just coincides with the bearing trace P to be erased. The single erase key 22 is then depressed and the desired erase process is thus initiated.

The storage device 12 is advantageously also provided with a device for erasing the entire store contents. For this purpose a separate erase input 18.3 is provided with a total erase key 23 which erases in a known manner the entire contents of shift register 18.

Figure 3:
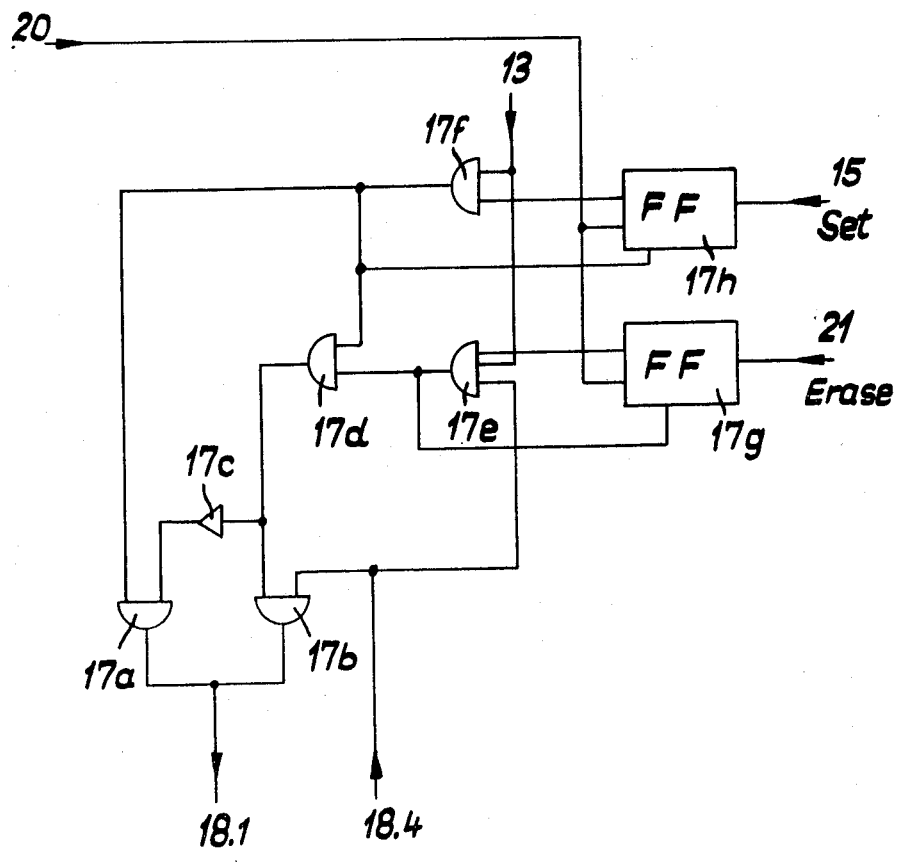
FIG. 3 is a block circuit diagram illustrating an example of the gating stage of FIG. 2.

FIG. 3 describes by block circuit example the function of the gating stage 17. In normal store operation the output 18.4 of the shift register 18 connected via gate 17 b to the setting input 18.1 of the shift register 18. When the setting key 16 is actuated this command, which appears on output 15, is stored in flip flop 17 h and enables the gate 17 f. Then the bearing trace signal $U_p$ at input 13 closes gate 17 b via gate 17f and opens gate 17a with the help of gate 17d and inverter 17c. The output signal of gate 17f is transfered via gate 17a to the shift register input 18.1. Thereafter, the output of gate 17 f resets flip flop 17 h in synchronism with the pulses from the clock pulse generator appearing on line 20. The signal erase command, from key 22 is stored in flip flop 17g and enables gate 17e.

Upon coincidence of the bearing trace signal $U_p$ and an output signal of the shift register 18.4, the output signal of gate 17e closes gate 17b and opens gate 17 a with the help of gate 17d and the inverter 17c. As there is no output signal from gate 17f in this case, a zero or "no data" information is transfered into the shift 18 via register input 18.1 instead of the output signal of the shift register 18 appearing at output 18.4.

Thereafter, the output of gate 17e resets flip flop 17g in synchronism with the pulses from the clock pulse generator appearing on line 20.

It will be understood that the above description of the present invention is susceptible to various modifications, changes and adaptations, and the same are intended to be comprehended within the meaning and range of equivalents of the appended claims.

I claim:

1. In a direction finding system operating according to the reflected beam method having a cathode-ray tube indicating device which provides a panoramic display, wherein the direction of the rotating transmitted and received beams is synchronized with the direction of deflection of the cathode-ray beam by means of bearing direction signals, including a reference direction signal and an angle of rotation signal in the form of an alternating voltage signal whose frequency is proportional to the momentary speed of rotation of the transmitted and received beams, contained in a bearing information transmission channel connected between the transmitter-receiver of the system and the deflection system of the cathode-ray tube, and wherein means are provided for producing bearing traces on the screen of the cathode-ray tube which are associated with arbitrarily selectable directions, the improvement wherein said means for producing bearing traces comprises:

means responsive to the signals in said bearing information channel for integrating the angle of rotation signal to provide a measured bearing angle signal whose value corresponds to the momentary angle of rotation relative to said reference direction, said integrating means including: pulse generating means responsive to the angle of rotation signal for producing a train of pulses proportional to the frequency thereof; and a counter connected to the output of said pulse generating means, said counter being responsive to the reference direction signal to be reset to its starting condition upon each appearance thereof;

at least one bearing trace signal generating means for continuously comparing the value of the bearing angle signal with a preset bearing angle value corresponding to the desired direction of a bearing trace on the screen of the cathode-ray tube, and for emitting a bearing trace signal whenever there is coincidence between the value of the bearing angle signal and the preset bearing angle value; and means for applying the emitted bearing trace signal to the brightness control circuit of the cathode-ray tube.

2. The apparatus as defined in claim 1 including a plurality of said bearing trace signal generating means connected in parallel, each of said signal trace generating means comparing the value of the bearing angle signal to a different preset bearing angle value, whereby a plurality of different bearing traces corresponding to the different preset bearing angle values can be produced on the screen of the cathode-ray tube.

3. The apparatus as defined in claim 1 wherein said integrating means includes a digital to analog converter for continuously providing an output signal proportional to the count in said counter.

4. In a direction finding system operating according to the reflected beam method having a cathode-ray tube indicating device which provides a panoramic display, wherein the direction of the rotating transmitted and received beams is synchronized with the direction of deflection of the cathode-ray beam by means of bearing direction signals, including a reference direction signal and an angle of rotation signal in the form of an alternating voltage signal whose frequency is proportional to the momentary speed of rotation of the transmitted and received beams, contained in a bearing information transmission channel connected between the transmitter-receiver of the system and the deflection system of the cathode-ray tube, and wherein means are provided for producing bearing traces on the screen of the cathode-ray tube which are associated with arbitrarily selectable directions, the improvement wherein said means for producing bearing traces comprises:

means responsive to the signals in said bearing information channel for integrating the angle of rotation signal to provide a measured bearing angle signal whose value corresponds to the momentary angle of rotation relative to said reference direction;

at least one bearing trace signal generating means for continuously comparing the value of the bearing angle signal with a preset bearing angle value corresponding to the desired direction of a bearing trace on the screen of the cathode-ray tube, and for emitting a bearing trace signal whenever there is coincidence between the value of the bearing angle signal and the preset bearing angle value;

a storage means controlled by said bearing direction signals for circulating data stored therein between its input and output in synchronism with said momentary angle of rotation, said storage means having its input connected to the output of said bearing trace signal generating means and its output connected to the brightness control circuit of said cathode-ray tube; and, control means connected to the input of said storage means for selectively causing the output signals from said bearing trace signal generator to be stored in said storage means whereby different bearing traces corresponding to the stored bearing trace signals are produced on the screen of the cathode-ray tube.

5. The apparatus as defined in claim 4 wherein said storage means includes a shift register which serves as its store unit.

6. The apparatus as defined in claim 4, wherein said storage means is provided with means for selectively erasing the stored signal corresponding to a particular bearing trace on the screen of the cathode-ray tube.

7. The apparatus as defined in claim 4, wherein said storage means is provided with means for erasing the entire stored contents of said storage means.

8. The apparatus as defined in claim 5 wherein said storage means comprises a pulse generating means for providing shifting pulses for said shift register in synchronism with said bearing direction signals, and a gating means connected between the input of said storage means and the signal input of said shift register for normally blocking the output signals from said bearing trace generating means and passing the output signals from said shift register; and wherein said control means includes means for causing said gating means to pass the output signals from said bearing trace generating means.

* * * * *

UNITED STATES PATENT OFFICE
CERTIFICATE OF CORRECTION

Patent No. 3,723,953      Dated March 27th, 1973

Inventor(s) Kurt Scheer

It is certified that error appears in the above-identified patent and that said Letters Patent are hereby corrected as shown below:

In the heading of the patent, line 5, change "Kupp" to --Krupp--; lines 5 and 6, change "beschanter" to --beschrankter--. In the Abstract, line 3, change "paroramic" to --panoramic--. Column 3, line 36, change "r" to --bearing--; line 37, change "$U_4$" to --$U_r$--; line 55, change "rc" to --4c--. Column 4, line 14, change "$U_2$" to --$U_w$--. Column 5, line 13, change "P" to --p--. Column 6, line 36, after "18" insert --is--; line 39, change "output" to --input--; line 51, after "register" insert --at output--; line 55, after "shift" insert --register--; line 56, before "input" delete "register".

Signed and sealed this 21st day of August 1973.

(SEAL)
Attest:

EDWARD M. FLETCHER, JR.
Attesting Officer

RENE D. TEGTMEYER
Acting Commissioner of Patents